(12) United States Patent
Argus et al.

(10) Patent No.: US 8,086,835 B2
(45) Date of Patent: Dec. 27, 2011

(54) ROOTKIT DETECTION

(75) Inventors: Christopher J. Argus, Crownpoint, IN (US); Chase N. Douglas, Fort Wayne, IN (US); Dan J. Di Spaltro, Bend, OR (US); Michael D. Fuller, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 1111 days.

(21) Appl. No.: 11/757,729

(22) Filed: Jun. 4, 2007

(65) Prior Publication Data

US 2008/0301426 A1 Dec. 4, 2008

(51) Int. Cl.
*G06F 9/24* (2006.01)
*G06F 15/177* (2006.01)

(52) U.S. Cl. ............... 713/2; 713/1; 713/100; 717/174; 726/22

(58) Field of Classification Search .................. 713/1, 2, 713/100; 717/174; 726/22
See application file for complete search history.

(56) References Cited

U.S. PATENT DOCUMENTS 5,511,184 A 4/1996 Lin
6,240,530 B1 * 5/2001 Togawa ............................ 714/38
2005/0081198 A1 * 4/2005 Cho et al. ......................... 717/174
2005/0229250 A1 10/2005 Ring et al.
2008/0162915 A1 * 7/2008 Price et al. ........................... 713/2
2008/0282350 A1 * 11/2008 Khilnani et al. ................. 726/24

FOREIGN PATENT DOCUMENTS

EP 656587 A1 7/1995

OTHER PUBLICATIONS

Sean's Blog, Making a bootable USB drive with BartPE or UBCD4Win, Mar. 31, 2006, pp. 1-3.*
PCuser, RootKitty BartPE plugin?, Dec. 4, 2006, p. 1.*

* cited by examiner

*Primary Examiner* — Thomas Lee
*Assistant Examiner* — Michael J Brown
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to rootkit detection and provide a method, system and computer program product for external rootkit detection and remediation. In one embodiment of the invention, an external rootkit detection tool can be provided. The tool can include external static memory with an input/output (I/O) port interface to an external I/O port on a target computing platform. The tool further can include a boot image disposed in the external static memory, and rootkit detection and remediation logic disposed in the external static memory and referenced by the boot image. In one aspect of the embodiment, the external static memory can include a universal serial bus (USB) key and, correspondingly, the I/O port can include an external USB port.

10 Claims, 1 Drawing Sheet

ROOTKIT DETECTION

BACKGROUND OF THE INVENTION

1. Field of the Invention

The present invention relates to the field of network security and more particularly to rootkit detection and remediation.

2. Description of the Related Art

Computing security has increasingly become the focus of information technologists who participate in locally and globally accessible computer networks. In particular, with the availability and affordability of network computing, even within the small enterprise, many computers and small computer networks provide access to a substantial number of end users continuously. Notwithstanding, the efficiencies gained, network computing is not without its price. Specifically, those computers and computer networks which heretofore had remained disconnected from the security risks of the Internet now have become the primary target of malicious Internet hackers, crackers and script kiddies, collectively referred to as "malicious hackers".

Malicious hackers utilize a vast selection of tools to wreak havoc in the computing world. Whereas some tools permit the malicious hacker to launch an attack directly into a computing environment, oftentimes malicious hackers prefer to utilize an intermediary from which to launch an attack. The choice of intermediary largely relates to the desirability of malicious hackers to evade detection. To that end, malicious hackers often seek to transform a host computing platform into a "zombie" platform commanded remotely by the malicious hacker to launch an attack on trusting collegial networks.

In furtherance of the goals of the malicious hacker, a "rootkit" is a collection of programmatic tools that enable administrator-level access to a computer or computer network. Typically, a malicious hacker utilizes the rootkit first by installing the rootkit onto a host after obtaining user-level access, either by exploiting a known vulnerability or cracking a password. Once the rootkit has been installed, the rootkit allows the malicious hacker to mask intrusion and to gain root or privileged access to the host and, possibly, other devices on a common network.

A rootkit generally includes spyware and other programs that monitor traffic and keystrokes. The rootkit commonly also includes program code enabled to create a "backdoor" into a target for use by the malicious hacker. The rootkit yet further often includes program code enabled to alter log files, attack other devices on a common network and to alter existing system tools to escape detection. Though robust in logic, rootkits have become increasingly more difficult to detect all the while having become more common. In this regard, rootkits can avoid detraction by inserting themselves in to the underlying belly of the operating system making it nearly impossible to detect while the operating system executes.

Contemporary rootkit detection software relies upon an analysis of different portions of the infected operating system during execution to identify established hooks into kernel system services of the operating system. To the extent, that system services have been intercepted and modified can indicate the possibility that the safety of the system is at risk and that spyware, viruses or malware are active. Still, most skilled artisans recognize that in many system tools such as monitoring and antivirus software, kernel hooks are the only available technique to achieve a desirable result and thus the presence of kernel hooks alone is not sufficient to identify the presence malware. Additionally, knowing the published operation of hook analysis only provides a circumvention challenge for the malicious hacker.

BRIEF SUMMARY OF THE INVENTION

Embodiments of the present invention address deficiencies of the art in respect to rootkit detection and provide a novel and non-obvious method, system and computer program product for external rootkit detection and remediation. In one embodiment of the invention, an external rootkit detection tool can be provided. The tool can include external static memory with an input/output (I/O) port interface to an external I/O port on a target computing platform. The tool further can include a boot image disposed in the external static memory, and rootkit detection and remediation logic disposed in the external static memory and referenced by the boot image. In one aspect of the embodiment, the external static memory can include a universal serial bus (USB) key and, correspondingly, the I/O port can include an external USB port.

In another embodiment of the invention, an external rootkit detection method can be provided. The method can include performing bootstrap of a target computing platform through a boot image in an external static memory, and detecting a rootkit component in the target computing platform from rootkit detection logic disposed in the external static memory. In this regard, In one aspect of the embodiment, detecting a rootkit component in the target computing platform from rootkit detection logic disposed in the external static memory can include detecting a rootkit component in an operating system component of the target computing platform from rootkit detection logic disposed in the external static memory. In another aspect of the embodiment, the method further can include mounting the external static memory read-only, receiving an encrypted form of an update for the external static memory, verifying the update and applying a decrypted form of the verified update to the external static memory.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for external rootkit detection and remediation. In accordance with an embodiment of the present invention, an external static memory device, for example a USB key, can be rendered bootable and can store thereon rootkit detection and remediation logic. The external static memory device can be removably communicatively coupled to a target computing platform through an external port for the target computing platform and the target computing platform can be placed into bootstrap from the external static memory device. Once bootstrap has completed, the rootkit detection and remediation logic can execute on the fixed storage and memory of the target computing platform to detect and remediate detected rootkit components. In this way, rootkit detection and remediation can be performed without first loading an infected operating system in the target computing platform.

Figure 1:
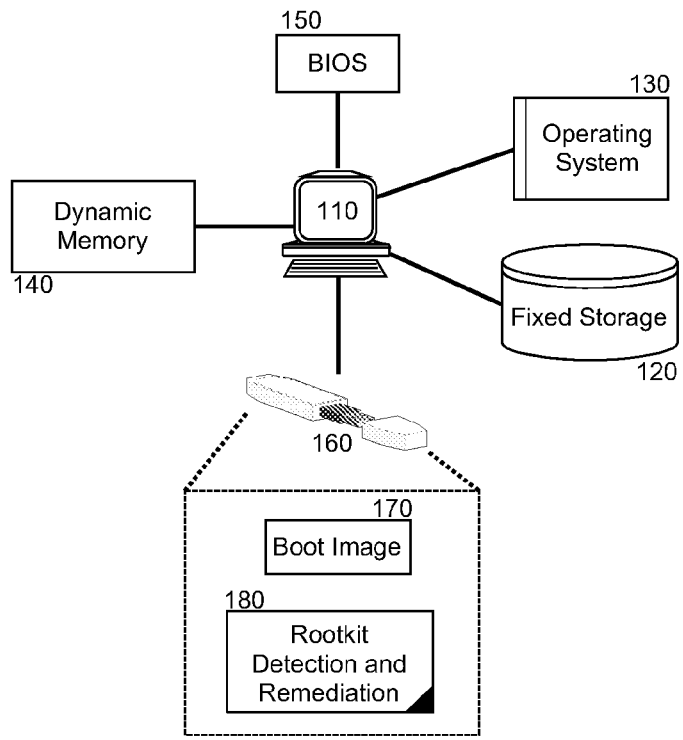
FIG. 1 is a schematic illustration of a computing system configured for external rootkit detection and remediation; and, FIG. 2 is a flow chart illustrating a process for external rootkit detection and remediation.

In illustration, FIG. 1 is a schematic illustration of a computing system configured for external rootkit detection and remediation. The system can include a target computing platform 110, such as a personal computer or server computing system. The target computing platform 110 can include both dynamic memory 140 and fixed storage 130. The fixed storage 120 further can include stored thereon an operating system 130 operable to be loaded by the target computing platform 110 into dynamic memory 140 for execution by the target computing platform 110. To that end, a basic input output system (BIOS) 150 also can be provided to facilitate bootstrap of the operating system 130 into dynamic memory 140 for execution.

Notably, the target computing platform 110 can be configured with an external I/O port (not shown) to accept an external static memory device 160, for example a USB key. The external static memory device 160 can include a boot image 170 and rootkit detection and remediation logic 180. The boot image 170 can include boot logic ordinarily found within the boot sector of fixed storage 120. The boot logic can include program code enabled to effectuate bootstrap of the target computing platform 110 and to turn over command and control of the target computing platform 110 to program code residing at a specific memory address in the external static memory device 160. In this regard, upon completion of bootstrap, the program code of the boot image 170 can be enabled to turn over command and control of the target computing platform 110 to the program code for the rootkit detection and remediation logic 180.

The program code of the rootkit detection and remediation logic 180 can be enabled to perform one or more rootkit detection processes. For example, a message digest (MD5) algorithm can be performed on operating system files to create a 128-bit message digest of the files and to compare the computed value with a 'known good' MD5 hash of a legitimate form of the files. A default file scan also can be performed on default files and directories known to be used by rootkits Yet further, hidden file detection scanning can be performed for hidden files in unexpected locations. Even yet further, abnormal or unusual permission scans can be performed on operating system files. As even yet a further alternative, backdoor shell checking on static ports can be performed. Finally, dictionary based string scanning can be performed on one or more directories in search of strings in files associated with rootkits.

Figure 2:
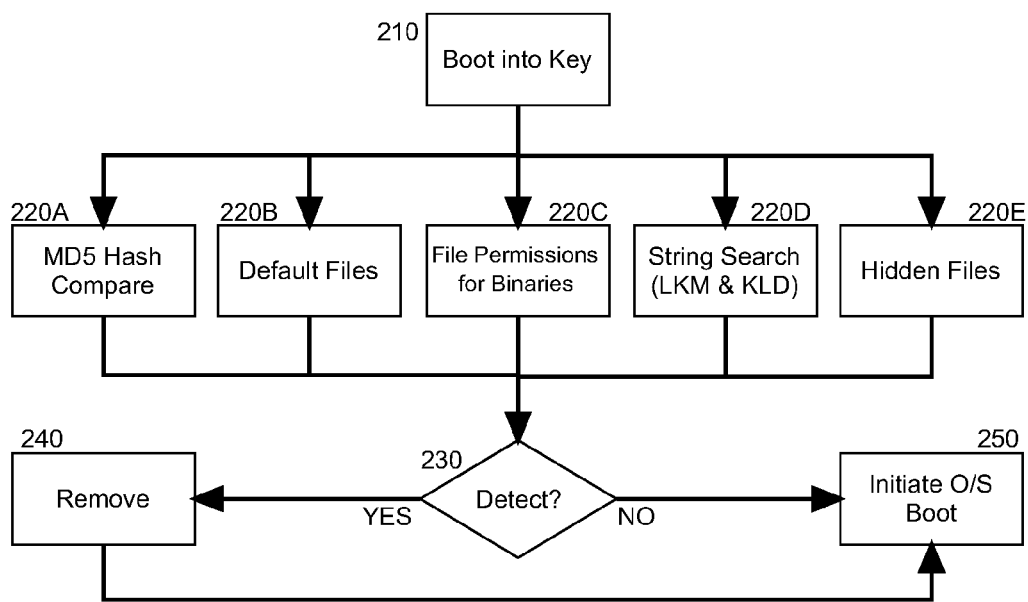

In further illustration, FIG. 2 is a flow chart illustrating a process for external rootkit detection and remediation. Beginning in block 210, the target computing platform can boot into an external static memory such as a USB key in lieu of booting into a boot image on fixed storage. In this way, rootkit detection can be performed on operating system files otherwise not fully examinable during the execution of the operating system and the need to install additional detection software onto the target computing platform can be obviated. In block 220A, 220B, 220C, 220D, 220E, one or more rootkit detection processes can execute, including MD5 compare, rootkit default file location, unusual file permission scanning, string searching and hidden file detection. In decision block 230, if a rootkit is detected, in block 240 the rootkit can be removed. Thereafter, bootstrap can be initiated for the operating system in fixed storage.

Notably, to prevent a rootkit from corrupting the external static memory, when the external static memory boots, the external static memory can be mounted as read-only. Notwithstanding, when an update to the rootkit detection and remediation logic becomes available, the update can be signed with an encryption key to ensure that the update cannot be reverse engineered and to confirm to the external static memory that the update is valid and has not been compromised. Finally, the external static memory though mounted read-only, can update itself upon confirming the validity of the update and un-encrypting the update.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An external rootkit detection and remediation tool comprising:

external static memory with an input/output (I/O) port interface to an external I/O port on a target computing platform;
a boot image disposed in the external static memory; and,
rootkit detection and remediation logic disposed in the external static memory and referenced by the boot image,
the external rootkit detection and remediation tool being configured to:
perform bootstrap of the target computing platform through the boot image in the external static memory;
perform rootkit detection on the target computing platform by executing at least one rootkit detection process;
detect a rootkit component in the target computing platform;
remove the detected rootkit component in the target computing platform;
initiate bootstrap for the target computing platform in a fixed storage of the target computing platform;
mount the external static memory read-only;
receive an encrypted form of an update for the external static memory;
verify the update; and,
apply a decrypted form of the verified update to the external static memory.

2. The tool of claim 1, wherein the external static memory is a universal serial bus (USB) key.

3. The tool of claim 2, wherein the I/O port is an external USD port.

4. The tool or claim 1, wherein the at least one rootkit detection process includes at least one of MD5 compare, rootkit default file location, unusual file permission scanning, string searching, and hidden file detection.

5. An external rootkit detection and remediation method comprising:
performing bootstrap of a target computing platform through a boot image in an external static memory;
performing rootkit detection on the target computing platform by executing at least one rootkit detection process by rootkit detection and remediation logic disposed in the external static memory;
detecting a rootkit component in the target computing platform by the rootkit detection and remediation logic;
removing the detected rootkit component in the target computing platform by the rootkit detection and remediation logic;
initiating bootstrap for the target computing platform in a fixed storage of the target computing platform;
mounting the external static memory read-only;
receiving an encrypted form of an update for the external static memory;
verifying the update; and,
applying a decrypted form of the verified update to the external static memory.

6. The method of claim 5, wherein performing bootstrap of a target computing platform through a boot image in an external static memory, comprises performing bootstrap of a target computing platform through a boot image in an externally coupled universal serial bus (USB) key.

7. The method of claim 5, wherein detecting a rootkit component in the target computing platform by the rootkit detection and remediation logic, comprises detecting a rootkit component in an operating system component of the target computing platform by the rootkit detection and remediation logic.

8. A computer program product comprising a computer usable medium embodying computer usable program code for external rootkit detection and remediation, the computer program product comprising:
computer usable program code for performing bootstrap of a target computing platform through a boot image in an external static memory;
computer usable program code for performing rootkit detection on the target computing platform by executing at least one rootkit detection process by rootkit detection and remediation logic disposed in the external static memory;
computer usable program code for detecting a rootkit component in the target computing platform by the rootkit detection and remediation logic;
computer usable program code for removing the detected rootkit component in the target computing platform by the rootkit detection and remediation logic;
computer usable program code for initiating bootstrap for the target computing platform in a fixed storage of target computing platform;
computer usable program code for mounting the external static memory read-only;
computer usable program code for receiving an encrypted form of an update for the external static memory;
computer usable program code for verifying the update; and,
computer usable program code for applying a decrypted form of the verified update to the external static memory.

9. The computer program product of claim 8, wherein the computer usable program code for performing bootstrap of a target computing platform through a boot image in an external static memory, comprises computer usable program code for performing bootstrap of a target computing platform through a boot image in an externally coupled universal serial bus (USB) key.

10. The computer program product of claim 8, wherein the computer usable program code for detecting a rootkit component in the target computing platform by the rootkit detection and remediation logic, comprises computer usable program code for detecting a rootkit component in an operating system component of the target computing platform by the rootkit detection and remediation logic.

* * * * *